(12) United States Patent
Kleuderlein et al.

(10) Patent No.: US 10,533,475 B2
(45) Date of Patent: Jan. 14, 2020

(54) FRAME ELEMENTS FOR CONTAINING MONOLITHS

(71) Applicant: Johnson Matthey Catalysts (Germany) GMBH, Redwitz an der Rodach (DE)

(72) Inventors: Robert Kleuderlein, Redwitz (DE); Dirk Reichert, Redwitz (DE); Harald Scherbel, Redwitz (DE)

(73) Assignee: Johnson Matthey Catalysts (Germany) GMBH, Redwitz an der Rodach (DE)

( * ) Notice: Subject to any disclaimer, the term of this patent is extended or adjusted under 35 U.S.C. 154(b) by 0 days.

(21) Appl. No.: 15/371,867

(22) Filed: Dec. 7, 2016

(65) Prior Publication Data
US 2017/0159529 A1    Jun. 8, 2017

Related U.S. Application Data

(60) Provisional application No. 62/263,901, filed on Dec. 7, 2015.

(51) Int. Cl.
*F01N 3/28* (2006.01)
*B01D 53/94* (2006.01)
(Continued)

(52) U.S. Cl.
CPC ......... *F01N 3/2842* (2013.01); *B01D 53/944* (2013.01); *B01D 53/9418* (2013.01);
(Continued)

(58) Field of Classification Search
CPC ... F16L 13/02; F16L 13/0209; F16L 13/0245; F16L 13/0281; F16L 13/06;
(Continued)

(56) References Cited

U.S. PATENT DOCUMENTS

| 4,544,525 A | 10/1985 | Honda et al. |
| 4,814,146 A * | 3/1989 | Brand ...................... B01J 33/00 422/179 |

(Continued)

FOREIGN PATENT DOCUMENTS

| DE | 8605649 | 4/1986 |
| EP | 2902601 A1 | 8/2015 |

(Continued)

*Primary Examiner* — Daniel C. McCracken

(57) ABSTRACT

An element frame for holding monoliths containing catalysts in the flow of exhaust gases from a combustion source, the element frame comprising two pairs of opposing walls, wherein the walls form a rectangular or square shape, an interior formed by the walls, an inlet end, an outlet end, at least one locking element, at least one mat and at least one monolith comprising an inlet, an outlet, four sides and at least one catalyst effective in reducing the concentration of one or more gases in the exhaust gas, wherein the at least one mat and the at least one monolith being positioned in the interior of the element frame so that there is at least one mat between the monolith and each adjacent wall, each locking element extending across the inlet end or outlet end of the element frame and being connected to two opposite sides of the element frame.

24 Claims, 7 Drawing Sheets

(51) Int. Cl.
*B01J 35/04* (2006.01)
*F01N 13/00* (2010.01)

(52) U.S. Cl.
CPC ............... *B01J 35/04* (2013.01); *F01N 3/28* (2013.01); *F01N 3/2853* (2013.01); *F01N 13/017* (2014.06); *B01D 2255/9155* (2013.01); *F01N 2350/04* (2013.01); *F01N 2450/22* (2013.01); *F01N 2450/30* (2013.01); *F01N 2590/02* (2013.01); *F01N 2590/10* (2013.01)

(58) Field of Classification Search
CPC ......... F16L 23/026; F16L 41/02; F16L 47/02; F16L 47/03; F16L 47/32; F16L 55/1116; F16L 55/1683; F16L 1/00; F16L 5/022; F01N 13/017; F01N 3/2842; F01N 3/2853; F01N 3/28; F01N 2350/04; F01N 2450/22; F01N 2450/30; F01N 2590/02; F01N 2590/10; B01J 35/04; B01J 2219/32275; F02M 2200/8084; F02M 35/1036; B01D 2255/9155; B01D 53/9418; B01D 53/944

See application file for complete search history.

(56) References Cited

U.S. PATENT DOCUMENTS

| | | | |
|---|---|---|---|
| 9,999,854 | B2 | 6/2018 | Kleuderlein et al. |
| 2009/0293464 | A1 | 12/2009 | Kaufmann et al. |
| 2011/0030355 | A1 | 2/2011 | Gilmer et al. |

FOREIGN PATENT DOCUMENTS

| | | |
|---|---|---|
| JP | S53128345 | 10/1978 |
| JP | H05220347 A | 8/1993 |
| JP | 07213865 | 8/1995 |
| JP | 11033409 | 2/1999 |
| JP | 2002239345 | 8/2002 |
| KR | 20150107385 A | 9/2015 |

* cited by examiner

FRAME ELEMENTS FOR CONTAINING MONOLITHS

CROSS-REFERENCE TO RELATED APPLICATIONS

This application claims priority to U.S. Provisional Patent Application No. 62/263,901, filed on Dec. 7, 2015, and is incorporated herein by reference.

FIELD OF THE INVENTION

The invention relates to an improved element frame that holds monoliths containing catalysts within the frame, where the element frame with the catalyst is configured to be placed in the flow of exhaust gas from an engine.

BACKGROUND OF THE INVENTION

The invention relates to element frames used in catalyst modules for treating exhaust gases from a stationary combustion source having an exhaust system passing exhaust gases through a support structure containing one or more monoliths, each containing one or more catalysts. A stationary combustion system can be any system that combusts a hydrocarbon-based fuel that is not used in an on-road operated car, truck or aircraft. They can be, for example, coal-fired systems, oil-fired (petroleum) systems or gas turbines. Stationary combustion systems can also be used in marine applications, where combustion systems such as diesel engines, as used for large container or cruise ships. Stationary combustion systems are usually operated continuously under a constant, stationary load while mobile combustion systems are usually operated under varying loads.

Hydrocarbon combustion in these systems, and in engines used in mobile applications, generates exhaust gas that must be treated to remove pollutants like nitrogen oxides (NOx), carbon monoxide (CO) or hydrocarbons (HC) that are formed. NOx is known to cause a number of health issues for humans and animals as well as causing a number of detrimental environmental effects including the formation of smog and acid rain. CO is toxic to humans and animals and HC can cause adverse health effects. To mitigate both the human and environmental impact from these pollutants, especially $NO_x$, in exhaust gas, it is desirable to eliminate these undesirable components, preferably by a process that does not generate other noxious or toxic substances.

Stationary combustion systems can be equipped with an emission control system, which is provided with catalyst modules. FIG. 1 is a depiction of a catalyst module known in the art. Catalyst modules are structures comprising a plurality of element frames, where each element frame can contain a plurality of monoliths each comprising a catalyst support and one or more catalysts. The catalyst modules are installed in a flue gas duct of the emission control system and the flue gas, which is to be purified, flows through the monoliths during operation. The flue gas duct can typically have a cross-sectional area of a few square meters and can be in the tens to hundreds of square meters. The dimensions of the flue duct can vary widely depending upon many factors, including the size of the engine, the conditions under which the engine is operated, permissible back pressure, etc. In some cases, the flue gas duct can have a rectangular cross-section with the width and the height of the duct each being several meters, for example, of 10 m×10 m. The entire cross-sectional area of the flue gas duct is covered by one or more catalyst modules. The catalyst modules are arranged next to one another so that all the flue gas passes through the monoliths, contacts the catalyst(s) on or in the monoliths and becomes purified. Several catalyst modules, for example, two to five, can be placed next to one another in rows and columns, often connected in a supporting framework, within the flue gas duct (FIG. 2). The catalyst modules themselves typically have a rectangular cross-section with an edge length of several meters.

In the direction of flow of the flue gas, catalyst modules frequently are located in several planes positioned one behind the other. In some applications, the catalyst modules can extend for several meters, and even as much as 10-15 meters in the direction of flow (FIG. 3). For some applications, such as marine or gas turbines, relatively harsh ambient conditions in terms of mechanical stress can be present for the catalyst modules. For example, on marine vessels, forces several times gravity can be experienced. In addition, especially for large cross-sections of catalyst modules used with gas turbines, mechanical stresses due to earthquakes have to be considered.

Catalyst modules can be constructed using a stacking frame in which several element frame units are inserted, where the element frame units contain monoliths comprising one or more catalysts. Flue gas flows through the individual monoliths in the direction of the flue gas flow. The monoliths are also known as honeycomb type catalysts. These honeycomb type catalysts are generally made of a ceramic material and have a plurality of flow channels through the monolith in the direction of the gas flow. In the installed, operating state, flue gas flows through the flow channels in the monolith where it interacts with catalyst in the monolith or in a coating on the surface of the monolith and becomes purified.

A typical problem encountered in the use of these treatment systems is that material placed between the monoliths and the element frame elements to provide a seal and therefore, gas-tightness i.e. no bypass flow around the catalyst, as well as, to act as a cushion against vibrations, is not able to stay in place during normal use except for when the material is specially designed and provided as a special type of mat that has a relatively high cost. The mat between element frame and a monolith containing one or more catalysts is placed in the element frame just before the element frame is welded together. In situations where there is periodical mechanical stress, which is typical in exhaust system conditions where engine pulsation leads to shock and vibrations, the mat can move against the frame and monolith. This movement can cause the destruction of the monolith because of the relatively low mechanical stability of the system to shock and vibrations.

Current element frames have metal flaps or lips that overlap the inlet and/or outlet faces of the monolith so that approximately 15% of the catalyst cells are not directly exposed to the exhaust flow.

Current element frames also have locking elements in the center of the inlet and outlet face. One of the functions of the locking element is to shield gaps between the monoliths from direct exhaust gas flow. The locking element is welded without prestress, which leads to relatively low mechanical stability against shock and vibrations.

The current designs of element frames do not provide a mechanism to attach the element frames directly to each other. The ability to join element frames together can avoid the need for a catalyst module when only a small number of element frames are needed.

It would be desirable to have a catalyst module that allows for a cost-effective material to be placed between the monoliths and the metal frame of the element frame to provide a seal and to act as a cushion against vibrations that can stay in place during normal use and also provide for the largest possible catalyst cross-section to be utilized, all under harsh mechanical stress conditions.

SUMMARY OF THE INVENTION

In a first aspect, the invention relates to an element frame for holding monoliths containing catalysts in the flow of exhaust gases from a combustion source, the element frame comprising two pairs of opposing walls where the walls form a rectangular or square shape, an interior formed by the walls, an inlet end, an outlet end, at least one locking element, at least one mat and at least one monolith comprising an inlet, an outlet, four sides and at least one catalyst effective in reducing the concentration of one or more gases in the exhaust gas, where the at least one mat and the at least one monolith is positioned in the interior of the element frame with at least one mat between the monolith and each adjacent wall, each locking element extending across the inlet end or outlet end of the element frame and being connected to two opposite sides of the element frame.

In a second aspect, the invention relates to a catalyst module comprising a plurality of element frames of the first aspect of the invention.

In another aspect, the invention relates to an exhaust system comprising an element frame of the first aspect of the invention.

In yet another aspect, the invention relates to an exhaust system comprising a catalyst module of the second aspect of the invention.

In still another aspect, the invention relates to a method of making an element frame of the first aspect of the invention.

In another aspect, the invention relates to a method of making a catalyst module of the second aspect of the invention.

In yet another aspect, the invention relates to a method of treating an exhaust gas, the method comprising passing an exhaust gas through monoliths in an element frame of the first aspect of the invention, where the monoliths comprise one or more catalysts effective in reducing the concentration of one or more gases in the exhaust gas.

In still another aspect, the invention relates to a method of increasing the amount of catalyst contacted with an exhaust gas, the method comprising passing an exhaust gas through a catalyst module of the second aspect of the invention.

DETAILED DESCRIPTION OF THE INVENTION

Figure 1:
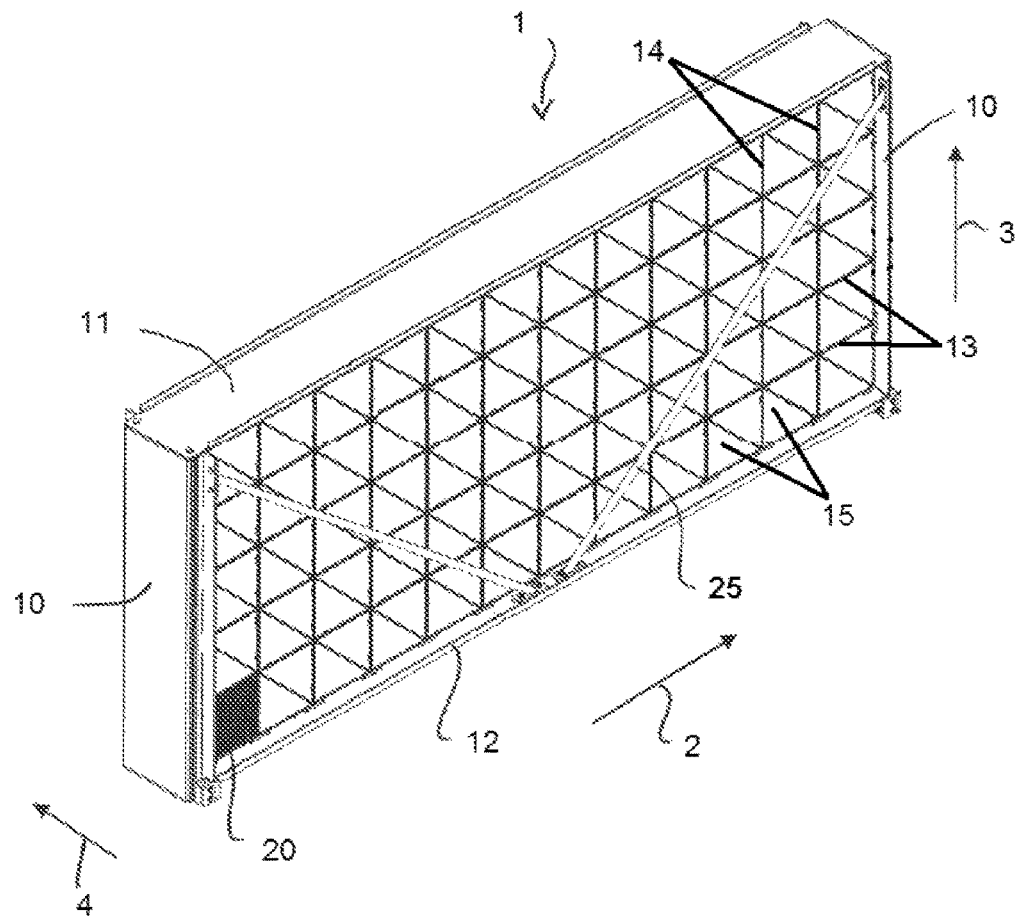
FIG. 1 is a three-dimensional depiction of a catalyst module.
Figure 2:
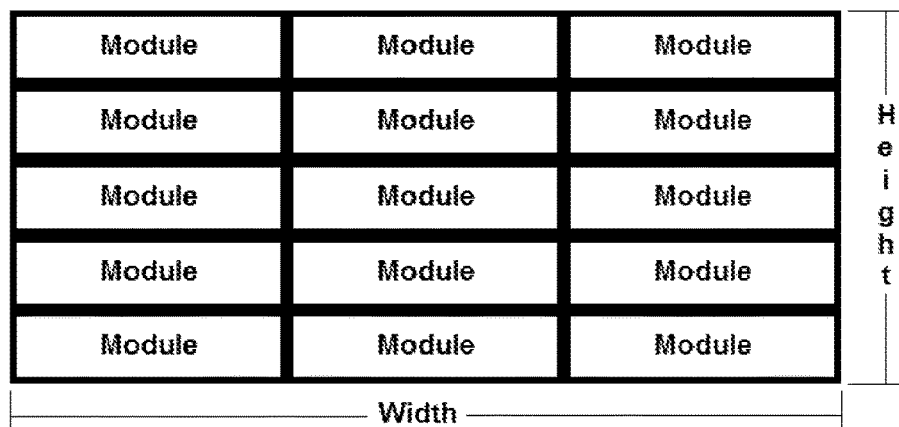
FIG. 2 is a diagram showing the placement of modules across the cross section of an exhaust duct.
Figure 3:
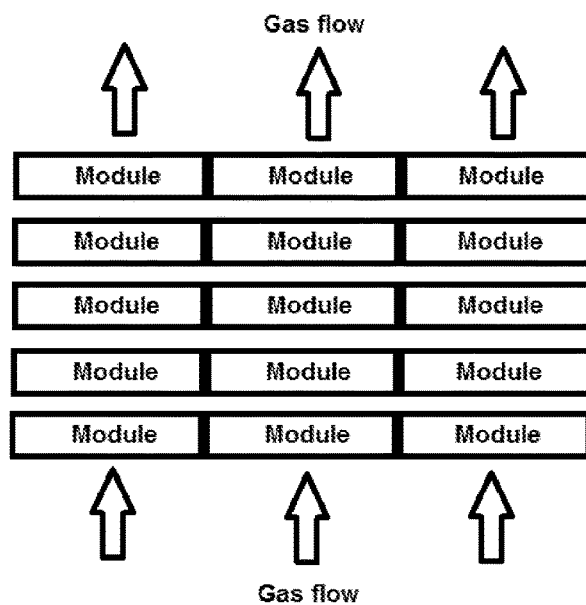
FIG. 3 is a diagram showing an overhead view of the placement of five groups of modules placed one after another in the direction of the gas flow within an exhaust duct.

As used in this specification and the appended claims, the singular forms "a", "an" and "the" include plural referents unless the context clearly indicates otherwise. Thus, for example, reference to "a catalyst" includes a mixture of two or more catalysts, and the like.

The term "substantially all" means at least 90%, preferably at least 95%, preferably at least 97%.

The term "support" means an inert material to which a catalyst is fixed.

The term "element frame" means a structure comprising four walls, each wall comprising a plurality of protrusions, where the four walls form a rectangle or a square, and define an interior of the element frame such that a plurality of monoliths, each having at least one mat covering a portion of each side of the monolith. The element frame can also contain a locking element on the inlet cross section which is used to shield the mat material from direct flow momentum and to act as a tie bar for high mechanical stability. The element frame can be made of steel, where the steel is any one of a number of different grades.

The term "locking element" means a structure that holds a monolith within an element frame. The locking element typically is made of the same material as the element frame, i.e. steel of any one of a number of different grades.

The term "cut-out" means a part or section of a frame element or locking element that is not present and provides for a reduction in the surface area of the frame element or locking element in relation to the flow of exhaust gas when the frame element or locking element is installed in the flow of exhaust gas. The cut-out increases the number of cells in a monolith that are directly exposed to the flow of exhaust gas. The term "directly exposed" means that exhaust gas enters cells in the monolith at an opening at the inlet side of the monolith.

A "mat" is to be understood as meaning a combination of mineral, glass or metallic fibers, for example in the form of a woven fabric, a knitted fabric, an irregular layer or the like. The mat may also be referred to as a web, fleece or non-woven material. The fibers used include a material which is able to withstand high temperatures and is resistant to corrosion. They can include in particular an iron base material to which alloying elements are added, with at least one alloying element being selected from nickel (8-11% by weight) or chromium (17-24% by weight) advantageously being present. One example of suitable fibers comprises 70% by weight of iron, 17% by weight of chromium and 8% by weight of nickel, although standard impurities may of course also be present. The mat can be produced by using fibers which are identical or different (for example with regard to the fiber length and fiber diameter). The fibers used may also comprise a mineral or glass based material. The mat can be a single piece or can be in the form of strips where the strips cover an entire side, or a portion of one or more sides, of a monolith or surround only a portion of the monolith.

The term "catalyst module" means a structure formed by, or containing, a plurality of element frames.

In the first aspect of the invention, an element frame for holding monoliths containing catalysts in the flow of exhaust gases from a combustion source, the element frame the element frame comprises two pairs of opposing walls where the walls form a rectangular or square shape, an interior formed by the walls, an inlet end, an outlet end, at least one locking element, at least one mat and at least one monolith comprising an inlet, an outlet, four sides and at least one catalyst effective in reducing the concentration of one or more gases in the exhaust gas, where the at least one mat and the at least one monolith is positioned in the interior of the element frame with at least one mat between the monolith and each adjacent wall, each locking element extending across the inlet end or outlet end of the element frame and being connected to two opposite sides of the element frame. At least one wall, preferably each wall, can comprise a plurality of protrusions extending into the interior of the element frame. The plurality of protrusions can be configured to contact a mat and hold the mat against a monolith comprising one or more catalysts when the monolith is located in the interior of the element frame.

Figure 4:
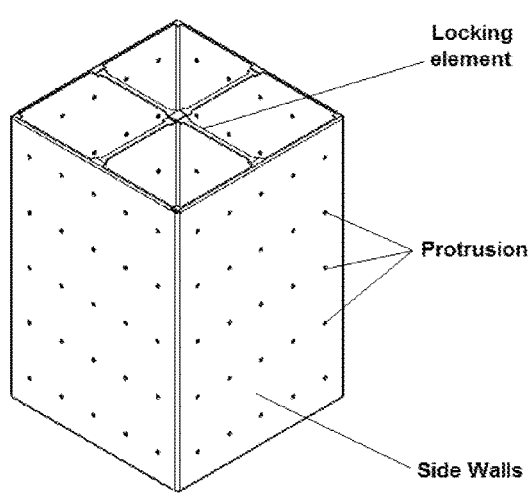
FIG. 4 is a three-dimensional depiction of a frame element.
Figure 5:
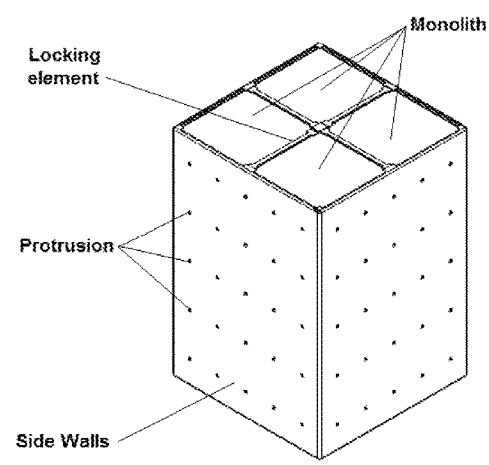
FIG. 5 is a three-dimensional depiction of a frame element with four monoliths in the frame element.
Figure 11:
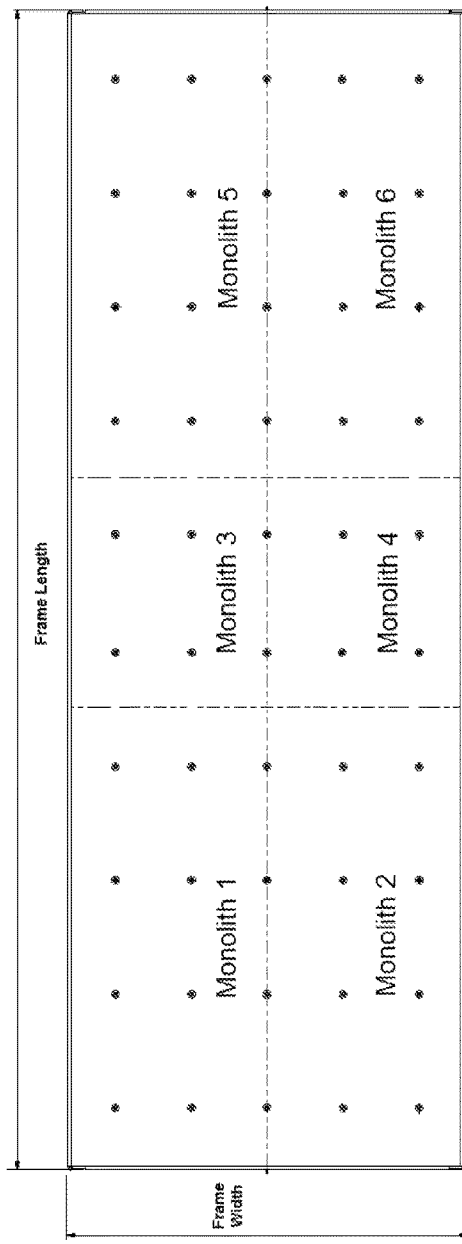
FIG. 11 depicts a side view of a frame element comprising four monoliths.
Figure 12:
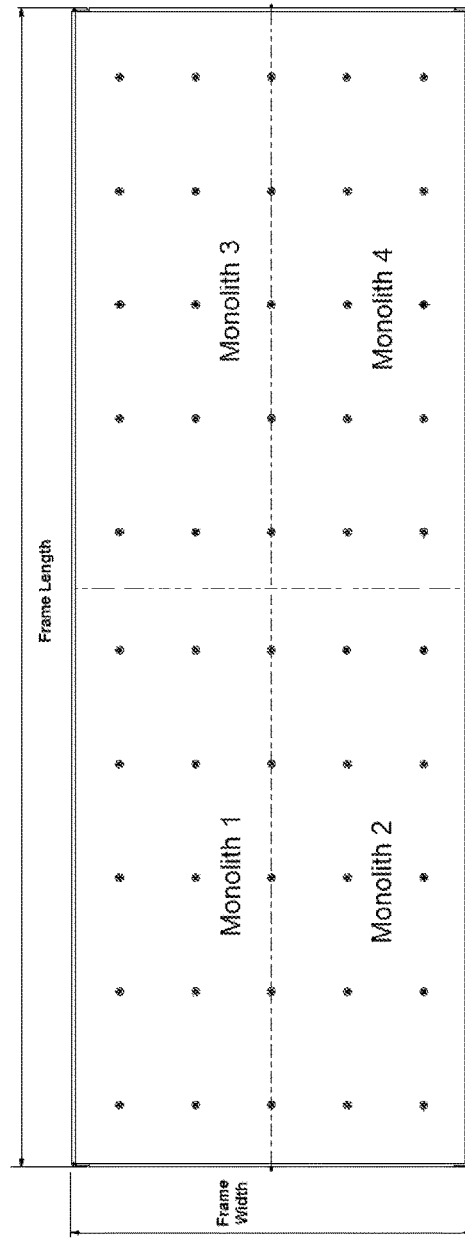
FIG. 12 depicts a side view of a frame element comprising six monoliths.

FIG. 4 is a three-dimensional depiction of an element frame. The element frame comprises four walls, and one or more, preferably all of the walls, can comprise a plurality of protrusions extending into the interior space formed by the four walls. The frame element can hold a plurality of monoliths within the interior space formed by the four walls, as shown in FIGS. 5, 11 and 12. The element frame can hold the monoliths in different configurations, such as 1 by 2, 1 by 3, 3 by 3, etc. The length (depth) of the element frame is based on the length the monoliths and the number of monoliths that may be placed serially within the element frame.

When two or more monoliths are present in the interior of the element frame and at least two monoliths are located adjacent two each other, at least one mat can be located between monoliths that are adjacent to each other. Preferably at least a portion of one or more mats is positioned: (a) between each side of a monolith and an adjacent monolith; and (b) between each monolith and an adjacent wall of the element frame.

Figure 6:
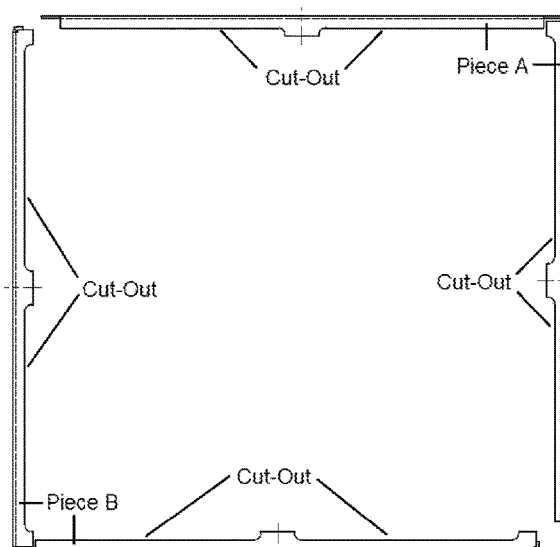
FIG. 6 is a depiction of part of an element frame shown from the inlet and/or outlet side showing two pieces each with adjacent wall and cut-outs in the inlet and/or outlet face.

The element frame can be formed by joining four walls other to form a rectangle or a square having an interior. Preferably, the element frame can be formed by joining two pieces, each comprising two walls, together. FIG. 6 shows a view from the inlet end or outlet end of two pieces (A and B), each comprising two walls formed by bending a single piece. The walls are not shown as they extend into the figure and are hidden by parts of the element frame at the inlet and/or outlet that are bent toward the interior of the element frame. The parts of the element frame at the inlet and outlet of the element frame preferably comprise one or more cut-outs that can increase the exposure area of monoliths placed within the element frame. Cut-outs of the element frame on the inlet and outlet face can reduce the number of cells in a monolith that are not directly seeing the exhaust flow. Preferably less than 10%, more preferably less than 8%, even more preferably less than 7%, even more preferably less than 6%, most preferably less than 5% of the catalyst cells are not directly exposed the exhaust flow. The reduction in the number of cells in the monolith that are not directly exposed to the gas flow can lead to lower back pressure, increase exposure of the exhaust gas to catalysts and higher conversion of compounds in the exhaust gas to other more desired compounds.

Pieces comprising the wall can be connected together, preferably by welding.

Figure 7:
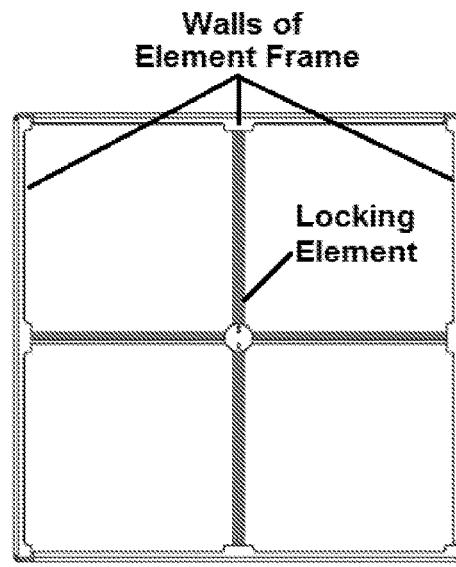
FIG. 7 depicts an end view of a frame element with a locking element attached.

FIG. 7 depicts a view of an element frame from an inlet or outlet end with two locking elements attached. Monoliths with their side wall at least partially covered by mats are placed within the walls of the element frame. Each locking element can be connected to each of the four sides by welding. The locking elements shown in FIG. 7 do not have cut-outs. Preferably the locking elements will comprise one or more cut-outs.

Figure 8:
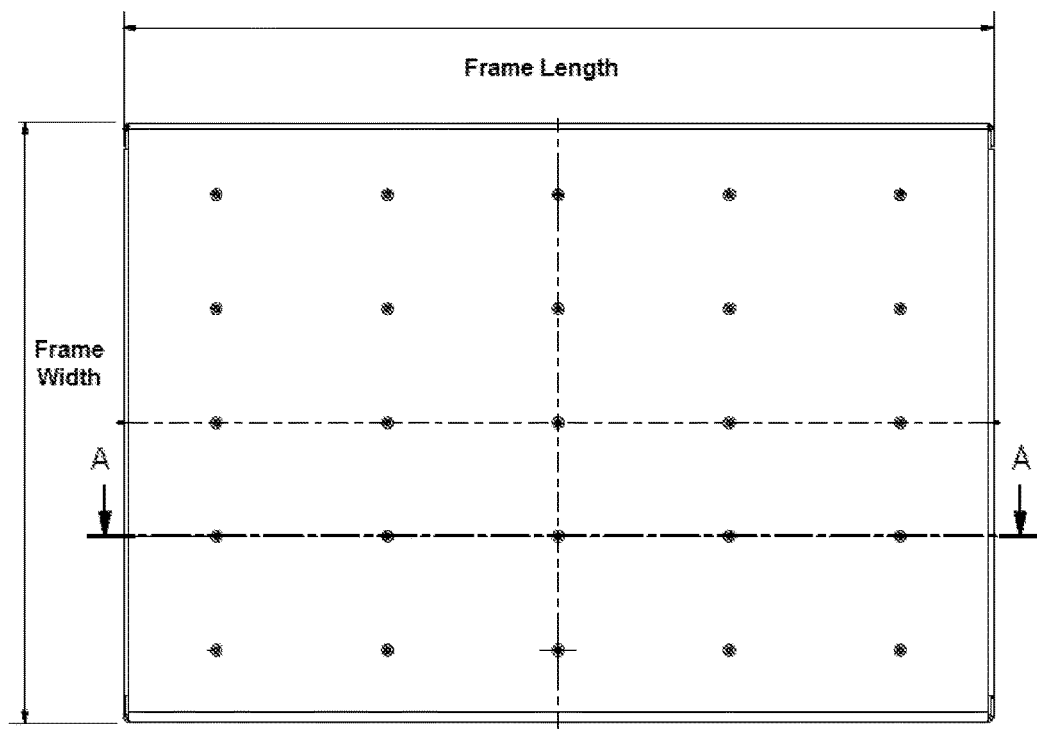
FIG. 8 depicts a side view of a frame element.

FIG. 8 depicts a side view of a frame element where the wall of the frame element has a length that is approximately the same as the length of the monolith. The width of the wall of the frame is dependent upon whether a single monolith or a plurality of monoliths, preferably two or three, are located adjacent to each other against the wall. When only a single monolith is located against a wall, the width of the wall is approximately equivalent to the size of the monolith against the wall plus the thicknesses of two mats. When a plurality of monoliths is located against a wall, the width of the wall is approximately equivalent to sum of the size of the monolith against the wall plus the number of monoliths times the thicknesses of two mats. Depending upon how the walls are put together, allowance may need to be made for the thickness of the walls and manufacturing tolerance of the monoliths.

Figure 9:
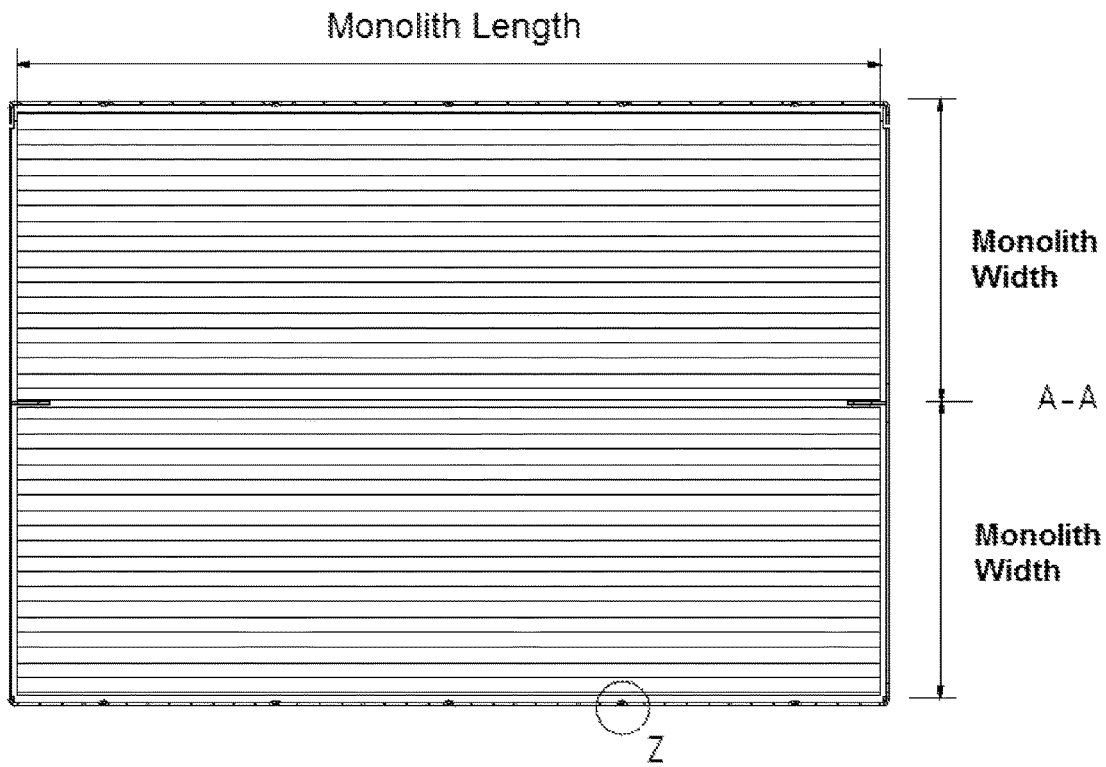
FIG. 9 depicts a cross-sectional view of a frame element with two monoliths within the cross-section of the frame element.
Figure 10:
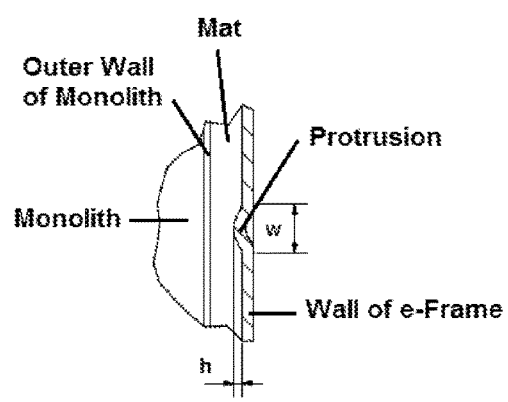
FIG. 10 depicts a cross sectional view of a protrusion on the frame element.

FIG. 9 depicts a cross-sectional view of the frame element showing the channels through the monoliths and protrusions in the walls of the element frame. In this drawing two monoliths are placed next to each other with their flow channels having the same direction of flow. The section of the drawing labeled "Z" is shown enlarged in FIG. 10 to show details of the protrusions.

Two or more monoliths can be placed serially within an element frame, as shown in FIGS. 11 and 12. The element frame can comprise a plurality of monoliths where two or more monoliths are positioned so that the outlet of a first monolith is adjacent to the inlet of a second monolith and a flow of exhaust gas passes sequentially through at least two monoliths. When three or more monoliths are used, exhaust gas exiting the second monolith can enter a third monolith. In these configurations one or more monoliths can be located downstream of one or more monoliths in the direction of flow of the exhaust gas through the monoliths in the element frame.

The element frame can comprise a plurality of monoliths where the two or more monoliths positioned so that the outlet of one monolith is adjacent to the inlet of another monolith contain catalysts having the same functionality. The term "having the same functionality" means that the catalysts adjacent to each other perform the same type of chemical reactions, such as selective catalytic reduction (SCR), ammonia oxidation, hydrocarbon oxidation, NOx storage, oxygen storage, etc.

The element frame can comprise a plurality of monoliths where two of the two or more monoliths positioned so that the outlet of one monolith is adjacent to the inlet of another monolith contain catalysts having different functionality. The term "having different functionality" means that the catalysts adjacent to each other perform different types of chemical reactions. Numerous types of configuration are possible. For example, a monolith comprising catalysts for selective catalytic reduction (SCR) can be followed by a monolith comprising catalysts for ammonia oxidation. A monolith comprising catalysts for hydrocarbon oxidation can be followed by a monolith comprising catalysts for selective catalytic reduction (SCR). A monolith comprising a catalyst providing NOx storage can be followed by a monolith comprising catalysts for SCR. Other possible combinations of catalysts are known to those skilled in the art.

At least one wall of the element frame can comprise an extended section, where the extended section comprises a plurality of openings, where the openings are configured to allow a fastener for joining the element frame to another element frame to pass through the opening.

At least two walls of the element frame can comprise an extended section comprising a plurality of openings, where the openings are configured to allow a fastener for joining the element frame to another element frame to pass through the opening.

Each of the four sides of the element frame can comprise an extended section comprising a plurality of openings, where the openings are configured to allow a fastener for joining the element frame to another element frame to pass through the opening.

Figure 13:
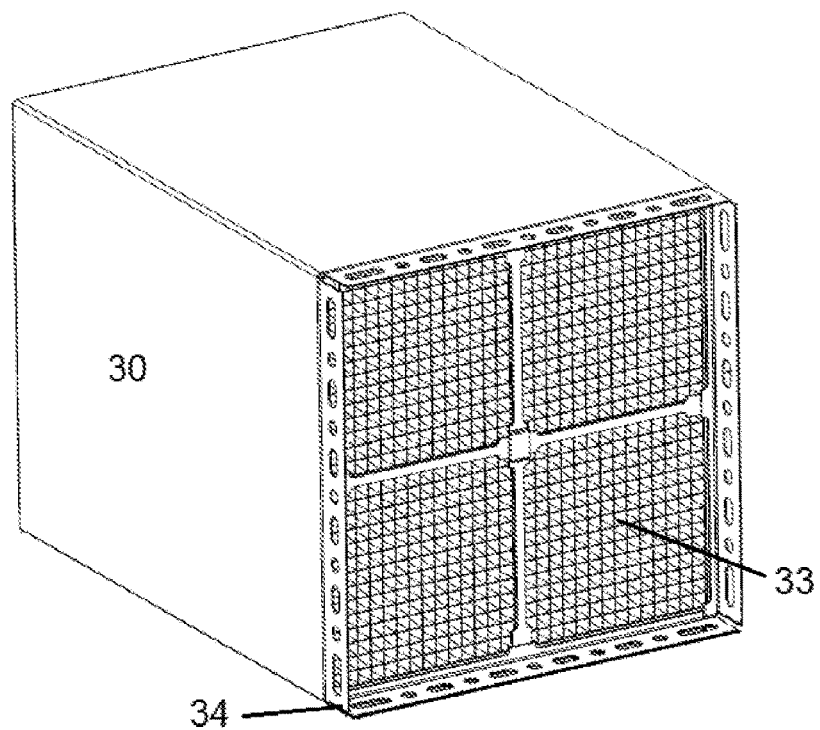
FIG. 13 is a three-dimensional depiction of a frame element with each of the sides having an extension for connecting the frame element to other frame elements.

Extended sections can be present on the inlet side, the outlet side, or both the inlet and outlets sides of the frame element. FIG. 13 shows an element frame where each of the sides (30) contain an extended section (34) comprising a plurality of openings. Two types of openings, holes and slots are shown in FIG. 13. Other shapes, or combinations of shapes, can be used.

Protrusions

One of more walls, preferably each wall, can comprise a plurality of protrusions extending into the interior.

The number and size of the protrusions on a wall can vary depending upon several factors, including, but not limited to the physical properties of the mat, the size of the mat and the number of mats used per wall, and the size of the wall of the element frame. FIG. 7 shows an element frame with each wall having 25 protrusions in a 5×5 matrix.

The function of the protrusions is to hold the mat between wall and monolith to suppress destruction of, or damage to, the monolith by shear forces. When a single mat is used to cover all four sides of the monolith, a smaller number of protrusions may be needed that when two or more mats are used to cover each side of the monolith. If the mat is in the form of strips where two or more strips are used on a side of a monolith, more protrusions would be needed that when a single mat is used to cover all four sides of the monolith. FIG. 9 depicts a cross sectional view of a protrusion on the frame element, where the protrusion has a height (h) and a base of width (w). The greater the height of a protrusion relative to the area of the base of the protrusion, the more likely that the protrusion can disturb the mat during normal use due to vibrations. However, a protrusion having a small height relative to the area of the base of the protrusion can be less likely to disturb the mat during normal use, and the relatively large base is better able to contact a larger surface area of the mat. The height of the protrusion can be about 1 mm and the protrusion can be about 6 mm wide. Depending upon the properties of the mat, the thickness of the wall of the element frame and the material, protrusions having other height and widths can be used, such as, for example, 2 mm×10 mm, or 1 mm×10 mm. A mat can be cut into large strips having a width approximately the same as the depth of the monolith. The mat can then be wrapped around the monolith, and then the monolith covered with the mat can be placed into the element frame. The mat can also be present as two of more strips, where the combined widths of the strips are less than or equal to the depth of the monolith. When two strips are used and the combined widths of the strips are less than the depth of the monolith, it is preferable that the strips are positioned off-center. The element frame is compressed and then the sides are welded together and a locking element is attached by welding to the four walls of the element frame on the inlet end and the outlet end.

The element frame according to the invention has an improved open frontal area for catalyst use of the exhaust gas while providing improved mechanical stability against shock and vibrations.

Monolith

The term "monolith", also known as a "honeycomb" type catalyst means a carrier having a plurality of fine, parallel gas flow passages extending from an inlet to an outlet face of the monolith, such that passages are open to fluid flow. A monolith can have a rectangular, preferably square, cross-sectional and inflow surface. The face of the monoliths can be of any dimensions, preferably between 10 cm to 30 cm, inclusive. The length of monolith in the direction of flow typically ranges from 15 cm to 150 cm, although other lengths can be used. The width of the element frame in the direction of exhaust gas flow is approximately the length of the monolith.

A monolith has an inlet, an outlet, four sides and a plurality of flow passages (or "cells"). Monoliths can contain up to about 700 or more flow passages per square inch of cross section, although far fewer may be used. For example, for stationary applications the carrier typically may have from about 9 to 600, more usually from about 35 to 300, cells per square inch ("cpsi"). The passages, which are essentially straight paths from their fluid inlet to their fluid outlet, are defined by walls onto which one or more catalysts effective in treating exhaust gases are coated as a "washcoat" so that the gases flowing through the passages contact the catalytic material.

One of ordinary skill in the art is familiar with the use and selection of one of more catalysts to reduce nitrogen oxides, carbon monoxides, hydrocarbons, ammonia slip and other pollutants to form nitrogen, water and carbon dioxide, which are relatively harmless compounds. The monolith can comprise one or more of an SCR catalyst, an ammonia oxidation catalyst, a hydrocarbon oxidation catalyst, a NOx storage catalyst, an oxygen storage catalyst, etc. The monolith can be a filter, such as a ceramic filter. Other types of catalyst can be present. The flow passages of the monolithic substrate are thin-walled channels which can be of any suitable cross-sectional shape such as trapezoidal, rectangular, square, triangular, sinusoidal, hexagonal, oval, circular, etc. The invention is not limited to a particular substrate type, material, or geometry. The monolith is generally an extruded material, preferably a ceramic substrate.

Ceramic substrates may be made of any suitable refractory material, such as cordierite, cordierite-α alumina, α-alumina, silicon carbide, silicon nitride, zirconia, mullite, spodumene, alumina-silica magnesia, zirconium silicate, sillimanite, magnesium silicates, zircon, petalite, aluminosilicates and mixtures thereof. The ceramic substrate can have catalytic activity itself. In some cases, no additional catalyst material is placed on ceramic substrates having catalytic activity.

Mats

One or more mats can form a seal restricting exhaust gas movement around the monolith. The mats can prevent direct physical contact between the monolith and the element frame and provide damping against shock and vibrations brought onto the element frame from external forces. Mats that can be used in this invention are known in the art.

A single mat can cover substantially all of the four sides of a monolith. At least a majority of each of the four sides of a monolith can be covered by a mat. A single mat can cover substantially all of the four sides of a monolith. One or more pieces of mat can surround all, or almost all, of the monolith. The mat can be in the form of strips and the strips can surround only a portion of the monolith.

At least a majority of the area of at least one side of a monolith can be covered by one or more mats.

At least a majority of the area of each of at least two sides of a monolith can be covered by one or more mats.

At least a majority of the area of each of the four sides of a monolith can be covered by one or more mats.

The thickness of the mat can be chosen such that the mat fills a gap between the monolith and the frame element and provides cushioning that allows the monolith to withstand a surface pressure of at least approximately 100, preferable approximately 150, more preferably approximately 200 Newtons/mm$^2$ of surface pressure when the element frame is pressed together during assembly.

The thickness of one or more mats that are used with a monolith can be determined based upon the size of the monolith onto which the mat is in contact. Monoliths are commercially available in a variety of sizes, with the tolerance of each size monolith being dependent upon the manufacturer. A monolith having a 150×150 mm cross-section can have a tolerance of ±3 mm. By having mats with different thicknesses, monolith having an actual cross-section of 149×149 mm would use a mat that is thicker than that used for a monolith having an actual cross-section of 153× 153 mm. The mat used on the monolith having an actual cross-section of 153×153 mm would be thinner than the mat used on a monolith having an actual cross-section of 150× 150 mm.

When the monolith has a nominal width N and an actual width A, the thickness of a mat used with a monolith having an actual width A equal to the nominal width N is B, and the desired thickness of a mat used with a monolith having an actual width C is:

a) $B+(A-C)$ when $C<A;$ b) $B$ when $C=A;$ and c) $B-(C-A)$ when $C>A,$ where the actual thickness of the mat used with a monolith having an actual width C is the closest thickness of commercially available mat of the material of width B. Two mats can be used to obtain the desired thickness.

Locking Element

The element frame comprises one or more locking elements where each locking element extends across the inlet end and/or outlet end of the element frame and is connected to opposite walls of the element frame. The locking elements hold the monoliths within the element frame and preclude the movement of opposite walls of the element frame. FIGS. 5 and 13 each show an element frame containing four monoliths in a 2 by 2 configuration with two locking elements, where each locking element is over the sides of two adjacent monoliths and a gap between the monoliths. In the case of a 1 by 3 monolith element frame, the inlet side and the outlet side each side can each comprise two locking elements, with each of the locking element located over a gap between two adjacent monoliths.

The locking elements preferably contain one or more cut-out. The cutout provides for an increase in the number of cells in the monolith that are directly exposed to the flow of exhaust gas when the catalyst module is exposed to exhaust gas from an exhaust gas source. When a locking element does not comprise cut-outs, a larger number of cells in the monoliths are covered by the locking element and this reduces the number of cells that come in direct contact with the exhaust gas. The width of the cut-out locking element is such that the gap between the monoliths is covered. In determining the width of the cut-out, the production tolerance of the widths of the monoliths should be considered. Locking elements located on the element frame on the inlet and outlet face can contain cut outs so that preferably less than 10%, more preferably less than 8%, even more preferably less than 7%, even more preferably less than 6%, most preferably less than 5% of the catalyst cells are not directly exposed the exhaust flow. This leads to lower back pressure and higher utilisation of the catalyst monoliths and therefore higher conversion.

Figure 14:
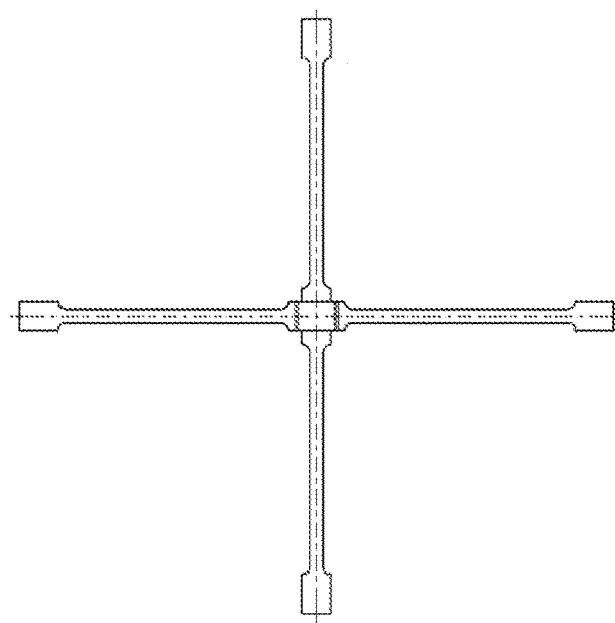
FIG. 14 is a depiction of two connected locking elements with cut-outs.

When at least one of (a) the walls of an element frame in the inlet and outlet of the element frame (as shown in FIGS. 6, 7 and 13) and (b) a locking element (as shown in FIGS. 13 and 14), comprise a cut-out, the amount of conversion of at least one of $NH_3$, NOx, hydrocarbons and carbon monoxide is greater than that of a comparable element frame not having cut-outs.

FIG. 7 depicts a view of an element frame from an inlet or outlet end with two locking elements attached. Monoliths with their side wall at least partially covered by mats are placed within the walls of the element frame. Each locking element can be connected to opposing walls by welding. The locking element is preferably welded into the element frame under prestress, which minimizes or prevents bulging of the element frame. Bulging of the element frame can lead to lower surface pressure and therefore a higher risk of movement of the monoliths under periodical mechanical stress like shock and vibrations in typical exhaust system conditions.

Catalyst Module

In another aspect of the invention, a catalyst module can comprise an element frame of the first aspect of the invention.

Catalyst modules of the invention can be in one of two groups: having a peripheral frame and without a peripheral frame.

Catalysts modules with a peripheral frame are known in the art, as shown for example in FIG. 1. Catalysts modules with a peripheral frame can have two sides 10, a top 11, a bottom 12 and a number of spaces 15 formed by horizon partitions 13 and vertical partitions 14. An element frame 20 of the first aspect of the invention, containing a plurality of monoliths comprising one or more catalysts, can be inserted within each of the spaces 15. Preferably the frame elements comprise one or more locking elements, as described above.

Figure 15:
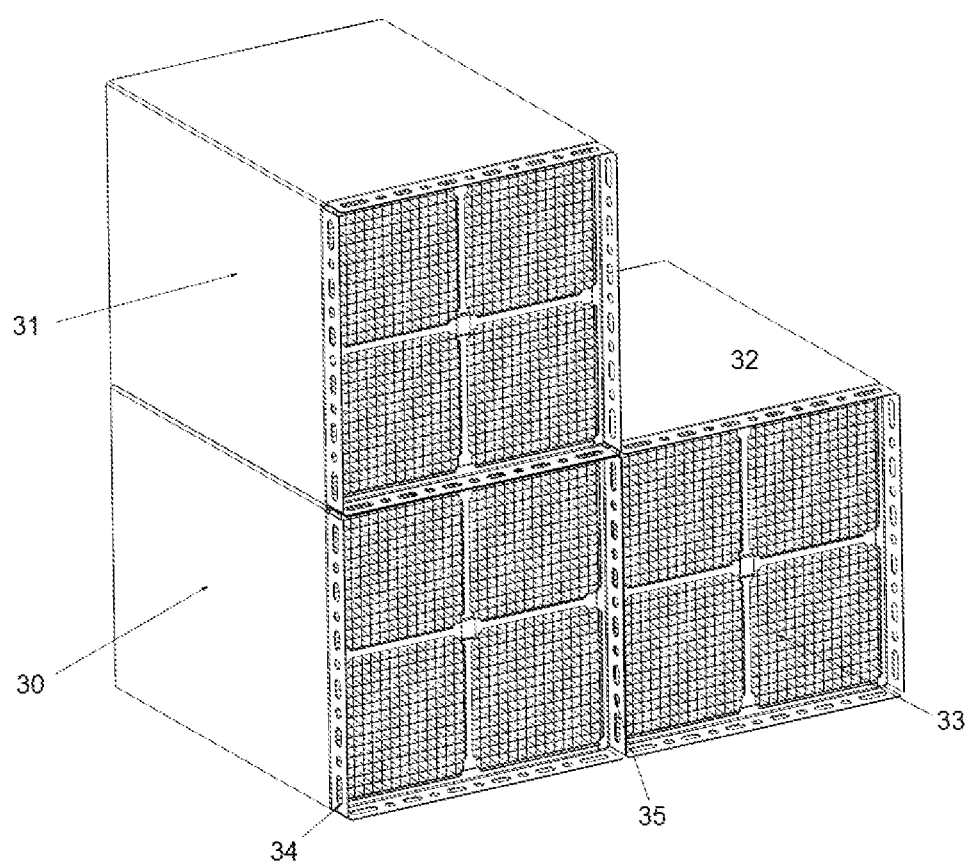
FIG. 15 is a three-dimensional depiction of three frame elements with the sides having extension for connecting the frame element to other frame elements where the frame elements contain monoliths.

A catalyst module without a peripheral frame can be formed by combining a plurality of element frames to each other by placing frame element adjacent to each other and placing element frames on top of other frame elements and connecting frame elements to adjacent frame elements. (See FIG. 15) A catalyst module without a peripheral frame is especially useful when only a small number of monoliths are need and the extra weight and complexity in using a catalyst module with a peripheral frame can be avoided.

Preferably, the frame elements are connected to adjacent frame elements. Adjacent frame elements can have a sealing element, such as a mat, located between them. Frame element can be connected to adjacent frame elements by welding, adhesives that can withstand temperatures, vibrations and shocks that the catalyst modules are subject to when placed in an exhaust gas stream or mechanical means, such as bolts, nuts, anchors, etc. Preferably, one or more sides of the element frames comprise an extension The element frames in the catalyst module can be arranged to minimize the passage of exhaust gas bypass around the element frames when the catalyst module is installed in an exhaust system.

A catalyst module can comprise a plurality of element frames where at least one wall of the element frame comprises an extended section comprising a plurality of openings, where the openings are configured to allow a fastener for joining the element frame to another element frame to pass through the opening and each element frame is connected to one or more elements frames through an extended section on the element frames.

A catalyst module comprising a plurality of element frames where at least one wall of the element frame comprises an extended section comprising a plurality of openings, where the openings are configured to allow a fastener for joining the element frame to another element frame to pass through the opening and the element frames are arranged so that there is minimal exhaust bypass around the element frames.

A catalyst module can comprise a plurality of element frames where at least two walls of the element frame comprise an extended section comprising a plurality of openings, where the openings are configured to allow a fastener for joining the element frame to another element frame to pass through the opening and the element frames are arranged so that there is minimal exhaust bypass around the element frames.

A catalyst module can comprise a plurality of element frames where each of the four sides of the element frame comprise an extended section comprising a plurality of openings, where the openings are configured to allow a fastener for joining the element frame to another element frame to pass through the opening and the element frames are arranged so that there is minimal exhaust bypass around the element frames.

Each of the frame elements in the catalyst module can be connected to an adjacent frame element when the frame elements comprise an extended section comprising a plurality of openings, where the openings are configured to allow a fastener for joining the element frame to another element frame to pass through the opening.

Each of the frame elements in the catalyst module can be connected to all adjacent frame elements when the frame elements comprise an extended section comprising a plurality of openings, where the openings are configured to allow a fastener for joining the element frame to another element frame to pass through the opening.

A catalyst module can further comprise a plurality of spaces formed by horizontal partitions and vertical partitions, where a frame element containing a monolith and one or more mats located between each side of the each monolith is present within a space.

The catalyst modules can be fixed directly into the exhaust duct or into a larger reaction space, called reactor, into the exhaust stream.

An exhaust system can comprise an element frame of the first aspect of the invention.

An exhaust system can comprise a catalyst module comprising an element frame of the first aspect of the invention.

When the monolith in an element frame, either alone or in a catalyst module, comprises an SCR catalyst, an exhaust system can further comprise a means for injecting a reductant fluid, e.g. a hydrocarbon or nitrogenous reductant or a precursor thereof, into exhaust gas upstream of the element frame. Preferably the means comprises an injector. One of ordinary skill in the art would realize that ammonia or some other type of reductant is needed when an SCR catalyst is used to convert nitrogen oxides into nitrogen. Such a person would understand how to add the reactant into the exhaust gas and use the SCR catalyst in the system. Such a person would also understand that means for injecting a reductant fluid into exhaust gas upstream are well known in the art.

In still another aspect, the invention relates to a method of making an element frame of the first aspect of the invention. A method of making an element frame of the first aspect of the invention comprises wrapping each monolith with a mat, placing the wrapped monolith within the interior of the element frame before the locking element is connected to the element frame and connecting the locking elements to the element frame while the element frame containing the mat wrapped monolith is subject to a compression force. Preferably the element frame is compressed with a pressure of at least approximately 100 Newtons/mm$^2$, preferably at least approximately 150 Newtons/mm$^2$, more preferably at least approximately 200 Newtons/mm$^2$, depending on the nature of the mat.

In another aspect, the invention relates to a method of making a catalyst module comprising a plurality of element frames of the first aspect of the invention. The method comprises forming an element frame comprising one or more monoliths, one or more mats and one or more locking elements by wrapping each monolith with a mat, placing the wrapped monolith within the element frame, connecting the one or more locking elements to the element frame while the element frame containing the mat wrapped monolith is subject to a compression force and either (a) connecting one or more element frames to each other to form a catalyst module, or (b) inserting the element frame containing the one or more locking elements into a partition in a frame in a catalyst module. Preferably the element frame is compressed with a pressure of at least approximately 100 Newtons/mm$^2$, preferably at least approximately 150 Newtons/mm$^2$, more preferably at least approximately 200 Newtons/mm$^2$, depending upon the nature of the mat. One of ordinary skill in the art would be familiar with techniques and procedures used to produce a catalyst module having a peripheral frame where the element frames described above can be placed within partitions in the element frame. Such a person would also be familiar with techniques and procedures used to connect element frames comprising an extension, as described above, to each other using mechanical fasteners.

A method of treating an exhaust gas comprises passing an exhaust gas through a monolith within an element frame of the first aspect of the invention, where the monolith comprises one or more catalysts effective in reducing the concentration of one or more gases in the exhaust gas.

A method of increasing the amount of catalyst contacted with an exhaust gas comprising passing an exhaust gas through an element frame of the first aspect of the invention where the element frame comprises a cut-out.

The invention can also be defined according to one or more of the following definitions:

1) An element frame for holding monoliths containing catalysts in the flow of exhaust gases from a combustion source, the element frame comprising two pairs of opposing walls where the walls form a rectangular or square shape, an interior formed by the walls, an inlet end, an outlet end, at least one locking element, at least one mat and at least one monolith comprising an inlet, an outlet, four sides and at least one catalyst effective in reducing the concentration of one or more gases in the exhaust gas, where the at least one mat and the at least one monolith is positioned in the interior of the element frame with at least one mat between the monolith and each adjacent wall, each locking element extending across the inlet end or outlet end of the element frame and being connected to two opposite sides of the element frame.
2) The element frame of 1), wherein two or more monoliths are present in the interior of the element frame, at least two monoliths are located adjacent two each other, and at least one mat is located between monoliths that are adjacent to each other.
3) The element frame of 1) or 2), wherein at least two locking elements are located on the inlet end of the element frame and at least two locking elements are located on the outlet end of the element frame.
4) The element frame of any of 1) to 3), where, when the element frame comprises at least two monoliths, a space is located between adjacent monoliths and at least one of the locking elements are located over, and preferably centered on, space between two monoliths.
5) The element frame of any of 1) to 4), wherein each locking element is connected to opposing walls by welding.
6) The element frame of any of 1) to 5), where the locking element comprises a cut-out, where the cutout provides for an increase in the number of cells in the monolith that are directly exposed to the flow of exhaust gas when the catalyst module is exposed to exhaust gas from an exhaust gas source.
7) The element frame of any of 1) to 6), wherein at least one of (a) the walls of an element frame in the inlet and outlet of the element frame and (b) a locking element, comprise a cut-out, the amount of conversion of at least one of $NH_3$, $NO_x$, hydrocarbons and carbon monoxide is greater than that of a comparable element frame not having cut-outs.
8) The element frame of any of 1) to 7), where each wall comprises a plurality of protrusions extending into the interior.
9) The element frame of 8), where the plurality of protrusions are configured to contact a fiber mat and hold the fiber mat against a monolith comprising one or more catalyst when the monolith is located in the interior of the element frame.
10) The element frame of any of 1) to 9), wherein at least one wall of the element frame comprises an extended section comprising a plurality of openings, where the openings are configured to allow a fastener for joining the element frame to another element frame to pass through the opening.
11) The element frame of any of 1) to 10), wherein at least two walls of the element frame comprise an extended section comprising a plurality of openings, where the openings are configured to allow a fastener for joining the element frame to another element frame to pass through the opening.
12) The element frame of 1) to 11), wherein each of the four sides of the element frame comprise an extended section comprising a plurality of openings, where the openings are configured to allow a fastener for joining the element frame to another element frame to pass through the opening.
13) The element frame of any of 1) to 12), where at least a majority of the area of at least one side of a monolith is covered by one or more mats.
14) The element frame of any of 1) to 13), where at least a majority of the area of each of at least two sides of a monolith is covered by one or more mats.
15) The element frame of any of 1) to 14), where at least a majority of the area of each of the four sides of a monolith is covered by one or more mats.
16) The element frame of any of 1) to 15), where the mat is in the form of strips and the strips surround only a portion of the monolith.
17) The element frame of any of 1) to 16), where the thickness of the mat is chosen such that the mat fills a gap between the monolith and the frame element and provides cushioning that allows the monolith to withstand a surface pressure of at least approximately 100, preferable at least approximately 150, more preferably at least approximately 200 Newtons/mm² of surface pressure when the element frame is pressed together during assembly.
18) The element frame of any of 1) to 17), where the monolith has a nominal width N and an actual width A, the thickness of a mat used with a monolith having an actual width A equal to the nominal width N is B, and the desired thickness of a mat used with a monolith having an actual width C is:

$$B+(A-C) \text{ when } C<A; \quad \text{a)}$$

$$B \text{ when } C=A; \text{ and} \quad \text{b)}$$

$$B-(C-A) \text{ when } C>A, \quad \text{c)}$$

where the actual thickness of the mat used with a monolith having an actual width C is the closest thickness of commercially available mat of the material of width B.
19) The element frame of any of 1) to 18), where one or more mats form a seal restricting exhaust gas movement around the monolith.
20) The element frame of any of 1) to 19), where the monolith comprises an SCR catalyst.
21) The element frame of any of 1) to 20), where the monolith comprises an oxidation catalyst.
22) The element frame of any of 1) to 21), where the monolith is a filter.
23) The element frame of any of 1) to 22), wherein the element frame comprises a plurality of monoliths and two or more monoliths are positioned so that the outlet of one monolith is adjacent to the inlet of another monolith and a flow of exhaust gas passes sequentially through at least two monoliths.
24) The element frame of 23), where the two or more monoliths positioned so that the outlet of one monolith is adjacent to the inlet of another monolith contain catalysts having the same functionality.
25) The element frame of 23), where two of the two or more monoliths positioned so that the outlet of one monolith is adjacent to the inlet of another monolith contain catalysts having different functionality.

26) A catalyst module comprising a plurality of element frames of any one of 1) to 25).
27) The catalyst module of 26), where the element frames are arranged to minimize the passage of exhaust gas bypass around the element frames when the catalyst module is installed in an exhaust system.
28) A catalyst module comprising a plurality of element frames of one or more of 10), 11), and 12), where each element frame is connected to one or more elements frames through an extended section on the element frames.
29) A catalyst module comprising a plurality of element frames of one or more of 10), 11), and 12), where the element frames are arranged so that there is minimal exhaust bypass around the element frames.
30) A catalyst module of any one of 26)-29), wherein each of the frame elements is connected to an adjacent frame element.
31) A catalyst module of any one of 26)-29), wherein each of the frame elements is connected to all adjacent frame elements.
32) A catalyst module of any one of 26)-31), wherein the catalyst module further comprises a plurality of spaces formed by horizontal partitions and vertical partitions, where a frame element containing a monolith and one or more mats located between each side of the each monolith is present within a space.
33) An exhaust system comprising an element frame of any one of 1) to 25).
34) An exhaust system comprising a catalyst module of any one of 26) to 32).
35) An exhaust system of 33) or 34), further comprising a means for forming $NH_3$ in the exhaust gas, where the means for forming $NH_3$ is located before the element frame or catalyst module.
36) A method of making an element frame of any one of 1) to 25), the method comprising wrapping each monolith with a mat, placing the wrapped monolith within the interior of the element frame before the locking element is connected to the element frame and connecting the locking elements to the element frame while the element frame containing the mat wrapped monolith is subject to a compression force.
37) The method of 36), where the element frame is compressed with a pressure of at least approximately 100 Newtons/mm$^2$, preferably at least approximately 150 Newtons/mm$^2$, more preferably at least approximately 200 Newtons/mm$^2$.
38) A method of making a catalyst module of any one of 26) to 32), the method comprising forming an element frame comprising one or more monoliths, one or more mats and one or more locking elements by wrapping each monolith with a mat, placing the wrapped monolith within the element frame, connecting the one or more locking elements to the element frame while the element frame containing the mat wrapped monolith is subject to a compression force and either (a) connecting one or more element frames to each other to form a catalyst module, or (b) inserting the element frame containing the one or more locking elements into a partition in a frame in a catalyst module.
39) The method of 38), where the compression force is at least approximately 100 Newtons/mm$^2$, preferably at least approximately 150 Newtons/mm$^2$, more preferably at least approximately 200 Newtons/mm$^2$.
40) A method of treating an exhaust gas, the method comprising passing an exhaust gas through a monolith within an element frame of any one of 1) to 25), where the monolith comprises one or more catalysts effective in reducing the concentration of one or more gases in the exhaust gas.
41) A method of increasing the amount of catalyst contacted with an exhaust gas, the method comprising passing an exhaust gas through an element frame of one of 6) or 7).

We claim:

1. An element frame for holding monoliths containing catalysts in the flow of exhaust gases from a combustion source, the element frame comprising:
    two pairs of opposing walls where the walls form a rectangular or square shape,
    an interior formed by the walls,
    an inlet end,
    an outlet end,
    at least one locking element,
    at least one mat, and
    at least one monolith comprising
        an inlet,
        an outlet,
        four sides and
        at least one catalyst effective in reducing the concentration of one or more gases in the exhaust gas,
    where the at least one mat and the at least one monolith is positioned in the interior of the element frame with at least one mat between the monolith and an adjacent wall of the element frame, each locking element extending across the inlet end or outlet end of the element frame and being connected to two opposite sides of the element frame,
    wherein one or more of the walls comprises a plurality of protrusions extending into the interior of the element frame, the protrusions being configured to contact and hold the at least one mat against the monolith.

2. The element frame of claim 1, wherein two or more monoliths are present in the interior of the element frame, at least two monoliths are located adjacent two each other, and at least one mat is located between monoliths that are adjacent to each other.

3. The element frame of claim 1, wherein at least two locking elements are located on the inlet end of the element frame and at least two locking elements are located on the outlet end of the element frame.

4. The element frame of claim 1, where, when the element frame comprises at least two monoliths, a space is located between adjacent monoliths and at least one of the locking elements are located over, and centered on, space between two monoliths.

5. The element frame of claim 1, where each wall comprises a surface comprising a plurality of protrusions, arranged in a grid pattern, extending into the interior.

6. The element frame of claim 1, wherein at least one wall of the element frame comprises an extended section comprising a plurality of openings, where the openings are configured to allow a fastener for joining the element frame to another element frame to pass through the opening.

7. The element frame of claim 1, where the thickness of the mat is chosen such that the mat fills a gap between the monolith and the frame element and provides cushioning that allows the monolith to withstand a surface pressure of at least approximately 100 Newtons/mm$^2$ of surface pressure when the element frame is pressed together during assembly.

8. The element frame of claim 1, where the monolith has a nominal width N and an actual width A, the thickness of a mat used with a monolith having an actual width A equal to the nominal width N is B, and the desired thickness of a mat used with a monolith having an actual width C is:

a) $B+(A-C)$ when $C<A;$ b) $B$ when $C=A;$ and c) $B-(C-A)$ when $C>A,$ where the actual thickness of the mat used with a monolith having an actual width C is the closest thickness of commercially available mat of the material of width B.

9. The element frame of claim 1, where the monolith comprises an SCR catalyst or an oxidation catalyst.

10. The element frame of claim 1, where the monolith is a filter.

11. The element frame of claim 1, wherein the element frame comprises a plurality of monoliths and two or more monoliths are positioned so that the outlet of one monolith is adjacent to the inlet of another monolith and a flow of exhaust gas passes sequentially through at least two monoliths.

12. The element frame of claim 11, where the two or more monoliths positioned so that the outlet of one monolith is adjacent to the inlet of another monolith contain catalysts having the same functionality.

13. The element frame of claim 11, where two of the two or more monoliths positioned so that the outlet of one monolith is adjacent to the inlet of another monolith contain catalysts having different functionality.

14. A catalyst module comprising a plurality of element frames claim 6, where each element frame is connected to one or more elements frames through an extended section on the element frames.

15. An exhaust system comprising an element frame of claim 1.

16. An exhaust system of claim 15, further comprising a means for forming $NH_3$ in the exhaust gas, where the means for forming $NH_3$ is located before the element frame or catalyst module.

17. A catalyst module comprising a plurality of element frames of claim 1.

18. A catalyst module of claim 17, wherein each of the frame elements is connected to an adjacent frame element.

19. A catalyst module of claim 17, wherein the catalyst module further comprises a plurality of spaces formed by horizontal partitions and vertical partitions, where a frame element containing a monolith and one or more mats located between each side of each monolith is present within a space.

20. An exhaust system comprising a catalyst module of claim 17.

21. A method of making an element frame of claim 1, the method comprising wrapping each monolith with a mat, placing the wrapped monolith within the interior of the element frame before the locking element is connected to the element frame and connecting the locking elements to the element frame while the element frame containing the mat wrapped monolith is subject to a compression force.

22. A method of making a catalyst module of claim 17, the method comprising forming an element frame comprising one or more monoliths, one or more mats and one or more locking elements by wrapping each monolith with a mat, placing the wrapped monolith within the element frame, connecting the one or more locking elements to the element frame while the element frame containing the mat wrapped monolith is subject to a compression force and either
 (a) connecting one or more element frames to each other to form a catalyst module, or
 (b) inserting the element frame containing the one or more locking elements into a partition in a frame in a catalyst module.

23. The method of claim 22, where the compression force is at least approximately 100 Newtons/mm$^2$.

24. A method of treating an exhaust gas, the method comprising passing an exhaust gas through a monolith within an element frame of claim 1, where the monolith comprises one or more catalysts effective in reducing the concentration of one or more gases in the exhaust gas.

* * * * *